Figure 1:
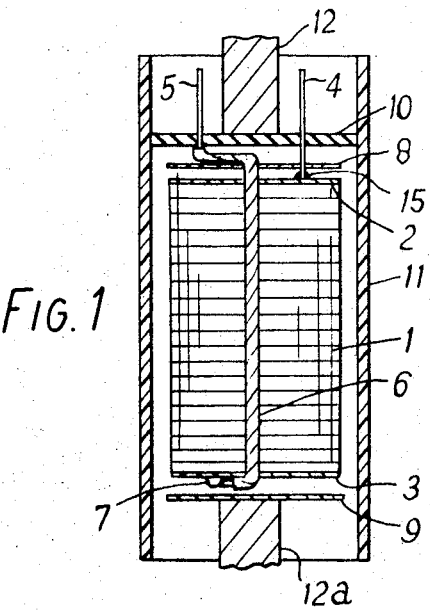

United States Patent [19]
Dutta

[11] 3,731,130
[45] May 1, 1973

[54] WOUND-FILM DRY CAPACITORS

[75] Inventor: Pulin Kumar Dutta, Poona, India

[73] Assignee: Plessey Handel Und Investments AG, Zug, Switzerland

[22] Filed: Feb. 10, 1972

[21] Appl. No.: 225,225

[30] Foreign Application Priority Data

Mar. 2, 1971  Great Britain..................5,759/71

[52] U.S. Cl..............317/258, 29/25.42, 174/DIG. 8, 174/52 S, 317/260
[51] Int. Cl. .....................................H01g 1/02
[58] Field of Search...................317/260, 258; 174/DIG. 8, 52 S; 29/25.42

[56] References Cited

UNITED STATES PATENTS

| 2,535,517 | 12/1950 | Rhodes | 317/260 X |
| 3,182,238 | 5/1965 | Toder | 317/260 X |
| 3,204,164 | 8/1965 | Burke | 317/260 |
| 3,311,697 | 3/1967 | Quinn | 317/260 X |
| 3,319,141 | 5/1967 | Cariou | 317/258 |
| 3,411,104 | 11/1968 | Pintell | 317/260 |

FOREIGN PATENTS OR APPLICATIONS

| 223,198 | 7/1959 | Australia | 317/258 |
| 978,357 | 12/1964 | Great Britain | 317/260 |

*Primary Examiner*—E. A. Goldberg
*Attorney*—Alex Friedman et al.

[57] ABSTRACT

A wound-film capacitor of metallized polypropylene film is mechanically strengthened, and made more fire-resistant, and the risk of oxidation of its metallized layer is reduced, by placing a sleeve of polyvinylchloride plastics round the would coil and the adjacent decks and heat-shrinking it to form a sheath in tight, shape-hugging contact with the wound-film unit and the decks and a sealing disc of greater diameter before the thus completed unit is placed into a can, with the thus wrapped radially projecting part of the sealing disc resting against an internal shoulder of the can.

10 Claims, 2 Drawing Figures

PATENTED MAY 1 1973

3,731,130

WOUND-FILM DRY CAPACITORS

This invention relates to dry capacitors of the wound-film type. In such capacitors the electrodes are formed as very thin metallized coatings on thin plastics material, for example polypropylene film, and the invention has for an object to provide an improved capacitor of the type referred-to which provides a high degree of protection of the wound-film unit.

According to the invention the wound-film unit, which comprises a cartridge formed by tightly winding in spiral fashion film having electrodes vapor-deposited or otherwise coated thereon, is enclosed in a tensionally prestressed sheath consisting of a sleeve of heat-shrinkable plastics material. The sheath is arranged not only to enclose the circumference of the wound-film unit but to extend beyond a sealing disc through which at least one connecting conductor extends, and whose diameter is greater than that of the unit, the sleeve-like sheath being shrunk also into prestressed circumferential contact with this disc to form a shoulder adapted to rest on an internal shoulder of a protective casing. Another aspect of the invention consists in a method of making a dry wound-film capacitor having a wound film unit that includes a wound cartridge of dielectric film having electrodes coated on the film, which includes the steps of placing around said unit and a sealing disc of greater diameter a sleeve of heat-shrinkable plastic material with the two ends of said sleeve projecting respectively beyond the two ends of said unit and beyond said disc, and subjecting the resulting assembly to such heat treatment as will cause the material of the sleeve to shrink sufficiently for the wall of the sleeve to embrace, after the heat treatment, the unit and disc under tensile stress, and for the projecting end portions of the sleeve to be deformed into flange portions applied to the ends of the capacitor-and-disc unit.

In the preferred form of the invention a wound-film unit of metallized polypropylene film is, together with the associated decks, enclosed circumferentially in a sleeve of polyvinyl-chloride material which has been shrunk by heat into pressure contact with the circumference of the unit and decks. Due to the fact that the sleeve has been heat-shrunk into pressure contact with the exterior of the wound-film unit, this unit is maintained under both radial and axial compression, a feature which minimizes penetration of air and thus oxygen between the layers of the wound-film unit, where the oxygen would be liable to attack the thin metallization layers constituting the electrodes of the capacitor. The whole assembly thus obtained is preferably mounted in a metal casing or "can," in which it is secured, together with the polyvinyl-chloride sleeve, by a conventional technique, preferably by bending-over the edges of the metal casing. The use of polyvinyl chloride as the material for the sheath offers, apart from the high shrinkage value of polyvinyl chloride, various other advantages. Thus the polyvinyl-chloride sleeve material will assist in the formation of an effective seal at the beading of the can against the penetration of oxygen and moisture into the can. Furthermore polyvinyl chloride is flame-retardent, and its affinity to oxygen assists in reducing the risk of attack of the film and its metallization inside the unit by any oxygen which may find its way into the wound-film unit.

In order that the invention may be more readily understood, one form of wound-film capacitor incorporating the invention, and its manufacture will now be described in more detail with reference to the accompanying drawing, in which FIG. 1 is an axial section showing the wound-film unit of a capacitor together with the decks and terminal leads of the capacitor supported in a fixture together with a sleeve of PVC plastics material, which is shown in position round the unit and decks before the sheath is heat-shrunk, and FIG. 2 similarly shows the capacitor when, after the removal of the fixture and the heat-shrinking of the sleeve, the capacitor has been secured in a conventional aluminum can.

Referring not first to FIG. 1, a wound-film unit 1 for a capacitor comprises two superimposed metallized polypropylene films wound tightly together into cylindrical form, the metallization of the two electrode strips being arranged on each film to extend to one but to remain spaced from the other of the lateral edges of the film. Sprayed-metal layers 2 and 3 are applied respectively to the two end surfaces of the wound-foil unit 1, and owing to the manner in which the metallization for the two electrodes is arranged in relation to the lateral edges of the films, each of these layers will establish an electrical connection to the metallization of one of the electrode films while being electrically insulated from the metallization of the other electrode film.

Two terminals 4 and 5 are provided for external connection at the upper end of the unit 1, the first mentioned terminal 4 being attached by soldering at 15 to the upper layer 2 of sprayed metal while the other terminal 5 is connected to a stranded wire 6 covered with polyvinyl-chloride insulation, which extends through a central tubular passage in the wound-film unit 1, and the lower end of which is soldered at 7 to the sprayed-metal layer 3 at the bottom end of the wound-film unit 1. Two disc-like decks 8 and 9 are arranged in the usual manner respectively adjacent to the upper and lower ends of the coil 1. The upper deck 8 consists of hard-paper material such as the material known under the name Elephantite and has apertures for the respective passage of the insulated wire 6 and of the terminal 4, while the lower deck 9 conveniently consists of a suitable phenol-formaldehyde plastics. A rubber-backed disc 10, having holes for sealing passage of the terminals 5 and 4, is placed at the outer side of the upper deck 8 and gives further support to the terminals 4 and 5. As shown in the Figure, the lower deck 9 is preferably slightly larger in diameter than the wound-foil unit 1, and the diameter of the rubber-backed disc 10 is appreciably larger than that of the lower deck 9 for reasons which will become apparent further below.

In order to provide the assembly so far described with further protection, a sleeve 11, whose internal diameter corresponds to the diameter of the rubber-backed disc 10, and which is made of polyvinyl-chloride material having high heat shrinkage, is placed round the assembly with the two ends of the sleeve 11 respectively projecting beyond the outer sides of the lower deck 9 and of the rubber-backed disc 10.

The assembly is then placed into a treatment fixture having jaws 12 and 12a which hold the parts in their correct position in the sleeve 11 and apply some pressure to the ends, and the thus loaded fixture is placed into an oven, where the temperature is maintained at 80°C for 5 minutes while the top and bottom discs are held squarely in position by the treatment fixture. After this heat treatment the fixture 12, 12a is removed. The sleeve 11 of polyvinyl-chloride material has, during the heat treatment, shrunk to the shape shown at 11a in FIG. 2, while the other elements, for which the same reference numerals have been employed as in FIG. 1, remain substantially unaltered.

Figure 2:
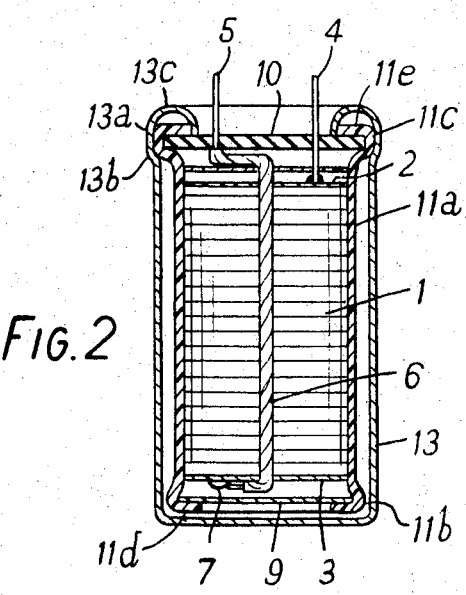

As will be seen in FIG. 2, the sleeve 11a now tightly encloses the wound-film unit 1, keeping it under radial and axial compression, and it forms beading 11b of relatively small radial height where the sleeve engages the outer edge of the lower deck 9, whose outside diameter is slightly larger than that of the wound-film unit 1, and beading 11c of somewhat greater radial height where the sleeve engages the edge of the rubber-backed disc 10. The previously projecting end portions of the sleeve 11 have, due to the heat shrinkage of the polyvinyl-chloride turned over to form flange portions 11d and 11e at the outer sides of the deck 9 and disc 10 respectively. While the assembly, when completed to this stage, already constitutes a complete capacitor, an outer metal casing, for example an aluminum can 13, will generally be provided as shown in FIG. 2. The illustrated can is supplied as a cup-shaped body of aluminum, formed near its upper end with a widened portion 13a for the accommodation of the larger-diameter portion of the capacitor unit presented by the beading 11c of the sleeve 11. The transition to this widened portion forms an annular shoulder 13b.

After the capacitor unit protected by the sleeve 11a has been inserted into the can 13 with the beaded portion 11c of the unit resting on the shoulder 13b, the upper edge of the aluminum can is spun-over, as shown at 13c, into contact with the rubber-backed disc 10 to retain the unit in position and to seal the can.

Inside the metal casing 13, in co-operation with the lower deck 9 and the rubber-backed disc 10, the shrunk-on polyvinyl-chloride sleeve 11a forms what may be called a primary encapsulation, and this is believed to reduce considerably the chance of oxidation of the metallization layer of the metallized polypropylene film in the wound-film unit 1, more particularly since on the one hand the shrunk-on sleeve 11a greatly reduces the amount of available free space round the wound-film unit and, on the other hand, due to the fact that polyvinyl-chloride is more readily oxidizable than the polypropylene and the metallization of the unit, so that most of the oxygen which otherwise would be liable to oxidize the metallization and/or the polypropylene film, will instead be used-up by oxidation of the polyvinyl-chloride sleeve. In addition the described construction is believed to considerably reduce the fire hazard of the capacitor because, in addition to reducing the amount of oxygen present near the winding, the presence of a sleeve of polyvinyl-chloride, which is itself a flame-retardent substance, will assist in quenching potential fires. Moreover, because a polyvinyl-chloride sleeve of relatively small thickness has been enabled, by the use of its shrinkage, to establish a seal hugging the shape of the unit, these advantages can be obtained with a minimum of added weight.

The shrunk-on polyvinyl-chloride sleeve also combines the wound-film unit and the rubber-backed disc by which this unit is suspended in the can, into a single, rigid body, thus preventing movement of the film unit relative to that disc and consequent damage to the electrical connections between each of the sprayed metal layers 2 and 3 and the associated terminal 4 or 5 of the capacitor.

It will be readily appreciated by those skilled in the art that the construction of the capacitor as described and illustrated may be modified in various details without exceeding the scope of the present invention. Thus the disc 9 shown at the lower end of the wound-film unit may be omitted and protection of the lower end of the unit be nevertheless ensured if the sleeve 11 is increased in length and arranged to project, before the heat treatment, beyond the lower end of the unit by an amount approximately equal to the radius of the wound-film unit, this projecting part being allowed, after the removal of the treatment fixture 12, 12a at the end of the heat treatment, to be deformed by shrinkage into a wide flange covering the lower end of the wound-film unit.

Furthermore, while in the illustrated embodiments all terminals are arranged at the same end of the wound-film unit, the invention is equally applicable to capacitors in which the two terminals are arranged at opposite ends of the unit either with the use of a casing that is open at both ends, thus allowing each terminal to remain electrically insulated from the housing, or with a casing or can that is electrically connected to one of the terminals, in which case one of the external connections may be effected to the can itself. Furthermore, the can, instead of being of stepped cup shape as described with reference to FIG. 2, may be a so-called type-C can, which is of cylindrical cup shape with an internal diameter that is sufficient to allow the insertion of the beaded portion 11c of the capacitor unit and with the provision of an inwardly beaded annular shoulder for supporting engagement with the lower edge of the beaded portion 11c of the polyvinyl-chloride plastics sleeve 11a.

It will also be readily appreciated that the temperature and length of time for the heat treatment are not critical and may also be modified to match variations in, for example, materials and dimensions.

What we claim is:

1. A capacitor device which comprises a wound cartridge of dielectric film and of thin-layer electrodes, a sealing disc of insulating material arranged coaxially with said cartridge adjacent to one end thereof and having a diameter substantially greater than that of said cartridge, an electrical conductor connected to one of said electrodes and sealingly extending through said sealing disc, and a sheath of heat-shrinkable insulating material tightly enclosing said cartridge and disc so as to form, between the parts of the length of the sheath that respectively enclose said disc and cartridge, an axially facing shoulder adjacent to said disc.

2. A capacitor device as claimed in claim 1, wherein the sheath consists of heat-shrunk polyvinyl-chloride plastic.

3. A capacitor device as claimed in claim 2, wherein the dielectric film is polypropylene film.

4. A capacitor device as claimed in claim 1, wherein said sheath has, at each of its ends, an inwardly projecting flange portion.

5. A capacitor device as claimed in claim 4, which includes a further disc of insulating material, arranged within said sheath coaxially with said cartridge adjacent to the other end thereof and having a diameter greater than that of said cartridge but substantially smaller than that of said sealing disc.

6. A dry capacitor, comprising in combination: a capacitor device as claimed in claim 1, a housing member having a generally cylindrical circumferential wall formed integral with a bottom at one end thereof and having, spaced from its other end, an inwardly projecting annular shoulder encircling an opening of a diameter smaller than the outside diameter of the part of the sheath enclosing said sealing disc but sufficiently large to permit the insertion of the capacitor device to a position of contact of its shoulder with the said inwardly projecting shoulder of the housing member, said housing member having portions which axially cooperate with the capacitor device at the other side of said sealing disc to retain the capacitor device in said position of contact.

7. A capacitor as claimed in claim 6, wherein the sealing disc consists, at its surface facing away from the cartridge, of a material having rubber-like mechanical characteristics, and wherein the end of the container wall is turned-back inwardly over the end of the sheath into edge contact with the said surface.

8. A method of making a capacitor device which comprises the step of providing a wound capacitor cartridge of dielectric film and of thin-layer electrodes, a sealing disc made of insulating material and having a diameter substantially greater than the diameter of said cartridge, an electrical conductor connected to one of said electrodes and extending through said sealing disc, and a tube of heat-shrinkable insulating material having an internal diameter slightly in excess of the diameter of said disc; inserting said cartridge, disc, and conductor into said tube with said cartridge and disc coaxially aligned in the tube- applying to said disc and cartridge an axial force towards each other to retain them in such position; applying, while maintaining such force, heat to the thus assembled elements to cause the insulating material to shrink into tight contact with said cartridge and disc and to form, between the parts of the length of the sheath that respectively enclose said disc and cartridge, an axially facing shoulder adjacent to said disc; and releasing said axial force after this heat treatment.

9. A method as claimed in claim 8, which includes the use of a tube of polyvinyl chloride plastic, and heat treatment at a temperature of approximately 80°C for a period of not less than 4 minutes.

10. A method as claimed in claim 9, wherein the heat treatment is carried out for a period of approximately 5 minutes.

* * * * *